(12) United States Patent
Ritter et al.

(10) Patent No.: US 10,318,810 B2
(45) Date of Patent: Jun. 11, 2019

(54) SYSTEMS AND METHODS FOR DETERMINING STATISTICS PLANT POPULATIONS BASED ON OVERHEAD OPTICAL MEASUREMENTS

(71) Applicant: SlantRange, Inc., San Diego, CA (US)

(72) Inventors: Michael Ritter, San Diego, CA (US); Michael Milton, San Diego, CA (US); Peter Matusov, La Jolla, CA (US)

(73) Assignee: SLANTRANGE, INC., San Diego, CA (US)

( * ) Notice: Subject to any disclaimer, the term of this patent is extended or adjusted under 35 U.S.C. 154(b) by 0 days.

(21) Appl. No.: 15/268,370

(22) Filed: Sep. 16, 2016

(65) Prior Publication Data

US 2017/0084039 A1    Mar. 23, 2017

Related U.S. Application Data

(60) Provisional application No. 62/220,596, filed on Sep. 18, 2015.

(51) Int. Cl.
| | | |
|---|---|---|
| *G06T 7/00* | (2017.01) | |
| *G06T 7/60* | (2017.01) | |

(Continued)

(52) U.S. Cl.
CPC ....... *G06K 9/00657* (2013.01); *G06K 9/6232* (2013.01); *G06T 7/11* (2017.01);

(Continued)

(58) Field of Classification Search
CPC ............. G06K 9/0063; G06K 9/00657; G06K 2209/17; G06K 9/6202; G01N 33/0098; G06T 2207/30188

See application file for complete search history.

(56) References Cited

U.S. PATENT DOCUMENTS 5,764,819 A * 6/1998 Orr ....................... G06K 9/0063
382/110
7,058,197 B1 * 6/2006 McGuire ............ G06K 9/00657
382/100

(Continued)

OTHER PUBLICATIONS

Moss, "Understanding Your Aerial Data; Plant Counting," retrieved online http://media.precisionhawk.com/topic/understanding-your-aerial-data-plant-counting (4 pages).

(Continued)

*Primary Examiner* — Bobbak Safaipour
(74) *Attorney, Agent, or Firm* — Pillsbury Winthrop Shaw Pittman LLP

(57) ABSTRACT

This disclosure describes a system and a method for determining statistics of plant populations based on overhead optical measurements. The system may include one or more hardware processors configured by machine-readable instructions to receive output signals provided by one or more remote sensing devices mounted to an overhead platform. The output signals may convey information related to one or more images of a land area where crops are grown. The one or more hardware processors may be configured by machine-readable instructions to distinguish vegetation from background clutter; segregate image regions corresponding to the vegetation from image regions corresponding to the background clutter; and determine a plant count per unit area.

21 Claims, 10 Drawing Sheets

(51) Int. Cl.
*G06K 9/00* (2006.01)
*G06K 9/62* (2006.01)
*G06T 7/11* (2017.01)
*G06T 7/174* (2017.01)
*G06T 7/62* (2017.01)
*G06T 7/194* (2017.01)

(52) U.S. Cl.
CPC .............. *G06T 7/174* (2017.01); *G06T 7/194* (2017.01); *G06T 7/62* (2017.01); *G06T 2207/10016* (2013.01); *G06T 2207/10036* (2013.01); *G06T 2207/10041* (2013.01); *G06T 2207/30188* (2013.01); *G06T 2207/30242* (2013.01)

(56) References Cited

U.S. PATENT DOCUMENTS

| | | | |
|---|---|---|---|
| 7,412,330 B2 | 8/2008 | Spicer | |
| 9,658,201 B2* | 5/2017 | Redden | G01N 33/0098 |
| 9,741,128 B2* | 8/2017 | Sirault | G06K 9/00 |
| 2004/0264763 A1* | 12/2004 | Mas | G01C 23/00 |
| | | | 382/154 |
| 2008/0059015 A1* | 3/2008 | Whittaker | G05D 1/0274 |
| | | | 701/23 |
| 2008/0065287 A1* | 3/2008 | Han | A01B 69/007 |
| | | | 701/28 |
| 2013/0235183 A1* | 9/2013 | Redden | G06K 9/2036 |
| | | | 348/89 |
| 2014/0180549 A1 | 6/2014 | Siemens | |
| 2014/0285673 A1 | 9/2014 | Hundley et al. | |
| 2014/0320707 A1 | 10/2014 | Olson | |
| 2015/0015697 A1 | 1/2015 | Redden | |
| 2015/0254800 A1* | 9/2015 | Johnson | C05C 11/00 |
| | | | 382/141 |
| 2015/0278640 A1* | 10/2015 | Johnson | G06K 9/00657 |
| | | | 382/110 |
| 2015/0324975 A1* | 11/2015 | Cope | G06T 7/0012 |
| | | | 382/110 |
| 2016/0133039 A1* | 5/2016 | Ritter | G06T 3/4038 |
| | | | 345/629 |
| 2017/0083747 A1* | 3/2017 | Guan | G06K 9/0063 |
| 2017/0228595 A1* | 8/2017 | Wilson | G06T 7/536 |
| 2017/0316282 A1* | 11/2017 | Ritter | G06K 9/00657 |
| 2018/0189564 A1* | 7/2018 | Freitag | A01G 22/00 |

OTHER PUBLICATIONS

PCT Application No. PCT/US2016/052308—International Search Report and Written Opinion dated Dec. 8, 2016 (10 pages).

* cited by examiner

SYSTEMS AND METHODS FOR DETERMINING STATISTICS PLANT POPULATIONS BASED ON OVERHEAD OPTICAL MEASUREMENTS

CROSS-REFERENCE TO RELATED APPLICATIONS

This application claims the benefit of U.S. Provisional Patent Application Ser. No. 62/220,596, filed Sep. 18, 2015, which is hereby incorporated by reference in its entirety.

FIELD OF THE DISCLOSURE

This disclosure relates to systems and methods for determining statistics of plant populations based on overhead optical measurements.

BACKGROUND

Farming practices may become more efficient by informing growers with more accurate and thorough information on the status of their crops. For example, timely and accurate knowledge of the emergent plant density and size distribution and their spatial variances across the field may enable growers and agronomists to a) determine more accurately how the emergent crop population differs from the planned population and where replanting may be necessary; b) detect poor germination areas which can then be investigated for bad seed, bad soil, or other disadvantageous conditions; c) detect malfunctioning planting implements for corrective action; d) more accurately and selectively apply inputs such as fertilizers, fungicides, herbicides, pesticides, and other inputs; e) more thoroughly understand how combinations of seed types, planting densities, soil chemistries, irrigation, fertilizers, chemicals, etc. contribute to crop populations which optimize production yields.

SUMMARY

Current solutions for estimating plant population statistics (or "stand count") may include humans manually counting individual plants at multiple, yet sparse, locations across a field. The area surveyed by this method may be less than 1% of the total field area. An estimate for the entire field may be determined through interpolation which consequently may lead to large errors as entire portions of the field may not be surveyed and may include unplanted, misplanted, or damaged areas.

More recently, airborne observations have been employed. While airborne methods may benefit by replacing the sparse sampling and interpolation limitations of manual counting with 100% coverage, they have been greatly limited by their ability to a) resolve individual plants; b) discriminate individual plants of the crop species from other plants (weeds) or detritus in the field for automated counting; and c) accurately determine the area of the measured region due to inaccuracies in aircraft altitude and ground elevation measurements. These limitations have led to very large errors in population statistics.

Exemplary implementations of the present disclosure may employ a remote sensing system (e.g. multispectral, hyperspectral, panchromatic, and/or other sensors) mounted to an airborne or other overhead platform and automated computer vision techniques to detect, resolve, and discriminate crop plants for counting and sizing over large areas of agricultural fields.

Accordingly, one aspect of the disclosure relates to a system configured for determining statistics of plant populations based on overhead optical measurements. The system may comprise one or more hardware processors configured by machine-readable instructions to receive output signals provided by one or more remote sensing devices mounted to an overhead platform. The output signals may convey information related to one or more images of a land area where crops are grown. The one or more images may be spatially resolved. The output signals may include one or more channels corresponding to one or more spectral ranges. The one or more hardware processors may be configured by machine-readable instructions to distinguish vegetation from background based on the one or more channels. The vegetation may include one or both of a crop population and a non-crop population. The background clutter may include one or more of soil, standing water, man-made materials, dead vegetation, or other detritus. The one or more hardware processors may be configured by machine-readable instructions to segregate image regions corresponding to the vegetation from image regions corresponding to the background clutter. The one or more hardware processors may be configured by machine-readable instructions to determine a plant count per unit area.

Another aspect of the disclosure relates to a method for determining statistics of plant populations based on overhead optical measurements. The method may be performed by one or more hardware processors configured by machine-readable instructions. The method may include receiving output signals provided by one or more remote sensing devices mounted to an overhead platform. The output signals may convey information related to one or more images of a land area where crops are grown. The one or more images may be spatially resolved. The output signals may include one or more channels corresponding to one or more spectral ranges. The method may include distinguishing vegetation from background clutter based on the one or more channels. The vegetation may include one or both of a crop population and a non-crop population. The background clutter may include one or more of soil, standing water, man-made materials, dead vegetation, or other detritus. The method may include segregating image regions corresponding to the vegetation from image regions corresponding to the background clutter. The method may include determining a plant count per unit area.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
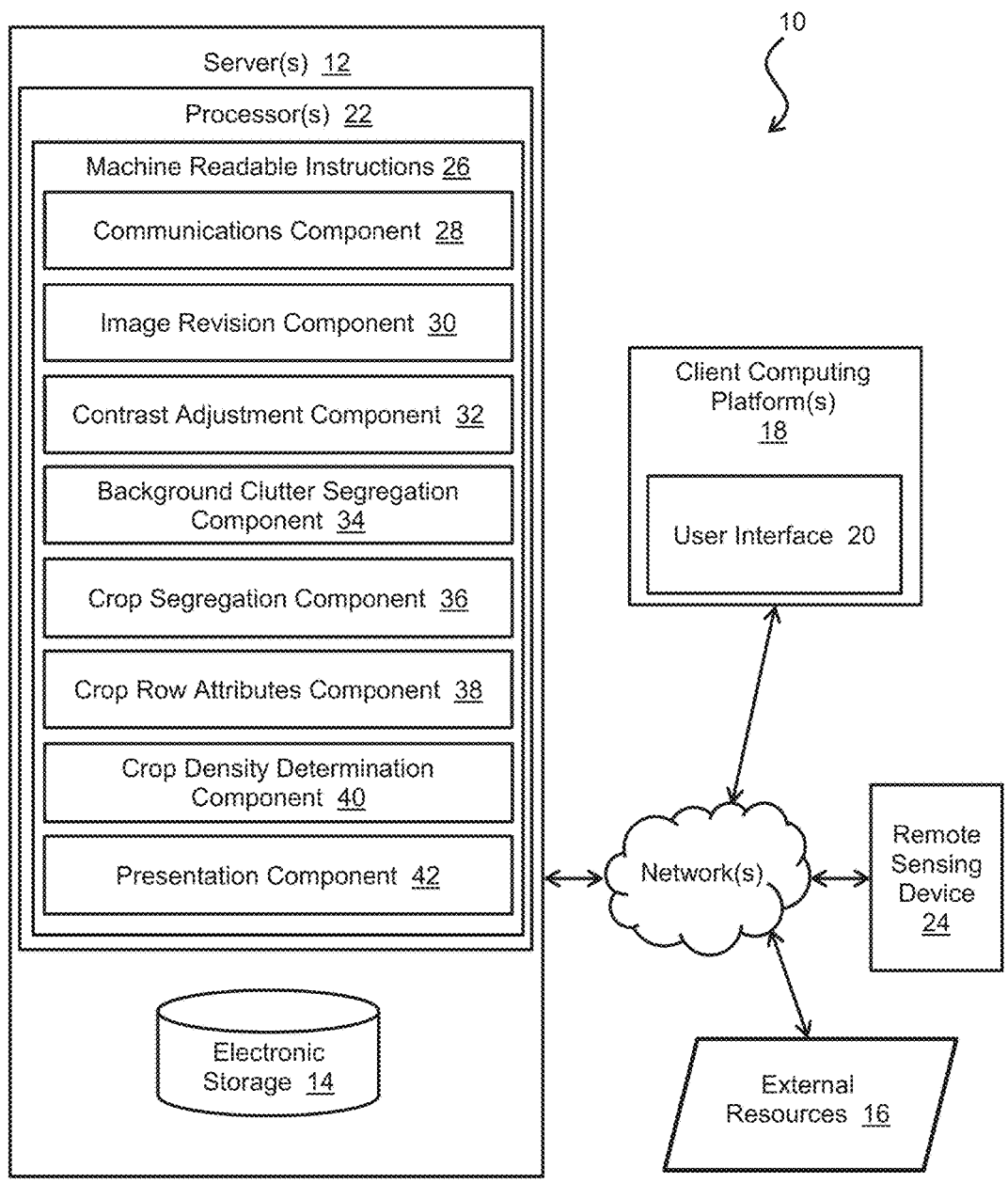
FIG. 1 illustrates a system configured for determining statistics of plant populations based on overhead optical measurements, in accordance with one or more implementations.

FIG. 1 illustrates a system 10 configured for determining statistics of plant populations based on overhead optical measurements, in accordance with one or more implementations. In some implementations, system 10 may include one or more remote sensing devices 24. In some implementations, system 10 may include one or more server 12. Server(s) 12 may be configured to communicate with one or more client computing platforms 18 and/or one or more remote sensing devices 24 according to a client/server architecture. The users may access system 10 via a user interface 20 of client computing platform(s) 18.

The one or more remote sensing devices 24 may be mounted to an overhead platform. In some implementations, the overhead platform may include one or more of an aircraft, a spacecraft, an unmanned aerial vehicle, a drone, a tower, a vehicle, a tethered balloon, farming infrastructure such as center pivot irrigation systems or other infrastructure, and/or other overhead platforms. In some implementations, the one or more remote sensing devices 24 may be configured to provide output signals. The output signals may convey information related to one or more images of a land area where crops are grown. In some implementations, the one or more images may include one or more spectral measurements. For example, the one or more images may include one or more of a color measurement, a multi-spectral measurement, a hyperspectral measurement, and/or other spectral measurements of a land area where crops are grown. In some implementations, the one or more remote sensing devices 24 may record two-dimensional images of the land area where crops are grown formed on a single or multiple focal plane arrays. For example, a color or multispectral measurement may be formed through multiple spectral filters applied to individual pixels in a single focal plane array, or through spectral filters applied to entire focal plane arrays in a multiple focal plane array configuration.

In some implementations, the one or more images may be of sufficient spatial resolution to detect individual plants within the crop population. In some implementations, the one or more images may be of sufficient spectral resolution to resolve spectral differences between growing vegetation and background clutter. In some implementations, the measurements may be of sufficient resolution such that the ground resolved distance (GRD) is smaller than a characteristic dimension of one or more target plants in the land area.

In some implementations, the one or more remote sensing devices 24 may provide output signals conveying information related to one or more of a time stamp, a position (e.g., latitude, longitude, and/or altitude), an attitude (e.g., roll, pitch, and/or yaw/heading), a spectral measurement of solar irradiance, calibration information specific to the device, and/or other information corresponding to individual ones of the one or more images. In some implementations, calibration may include adjusting the one or more images for sunlight conditions, systemic errors, or positioning the image onto the earth's surface for output mapping. In some implementations, the one or more remote sensing devices 24 may provide output signals conveying information related to one or more environmental parameters, time stamp, the position, the attitude, and/or other information corresponding to individual ones of the one or more images. For example, the one or more environmental parameters may include spectral measurements of downwelling solar illuminance, temperature, relative humidity, and/or other weather or environmental conditions. In some implementations, output signals conveying information related to one or more environmental parameters, time stamp, the position, the attitude, and/or other information may be utilized to calibrate the one or more spectral images. In some implementations, the output signals may be synchronous to the one or more images. For example, each image may include the output signals as metadata whose time of validity corresponds to the image.

Figure 2:
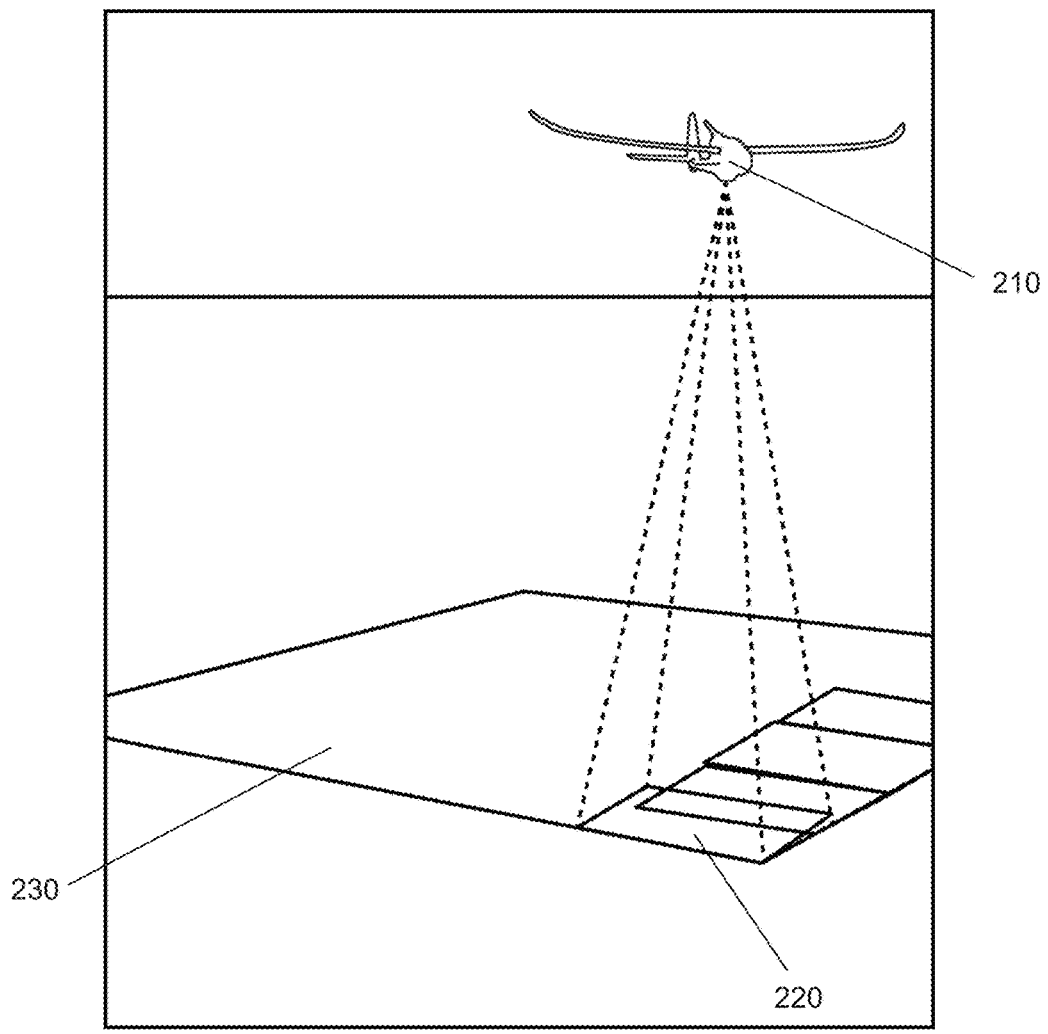
FIG. 2 illustrates spectral images obtained from an airborne platform, in accordance with one or more implementations.

By way of a non-limiting example, FIG. 2 illustrates spectral images obtained from an airborne platform, in accordance with one or more implementations. As shown on FIG. 2, an airborne platform 210 having one or more remote sensing devices may provide one or more images 220 of a land area 230 where crops are grown.

Returning to FIG. 1, the server(s) 12 and/or client computing platform(s) 18 may be configured to execute machine-readable instructions 26. The machine-readable instructions 26 may include one or more of a communications component 28, an image revision component 30, a contrast adjustment component 32, a background clutter segregation component 34, a crop segregation component 36, a crop row attributes 38, a crop density determination component 40, a presentation component 42, and/or other components.

Machine-readable instructions 26 may facilitate determining statistics of plant populations based on overhead optical measurements. In some implementations, communications component 28 may receive output signals provided by one or more remote sensing devices mounted to an overhead platform. In some implementations, the output signals may include one or more spectral images, metadata related to the one or more spectral images, and/or other information. The output signals may convey information related to one or more images of a land area where crops are grown. In some implementations, the one or more images may be spatially resolved and spectrally resolved. In some implementations, spatially resolved images may include one or more images corresponding to crop plants, non-crop plants, a land area, and/or other locations. In some implementations, the one or more images may include individual pixels corresponding to a spectral range. In some implementations, the individual pixels may include intensity values corresponding to the spectral range. For example, the one or more remote sensing devices may include a first camera having a red filter thereon and a second camera having a near infrared filter thereon. An Image captured by the first camera may include pixel values indicating intensity in the red spectral range and an image captured by the second camera may include pixel values indicating intensity in the near infrared spectral range. In some implementations, the output signals may include one or more channels. In some implementations, multiple channels may be part of a single remote sensing device. In some implementations, multiple channels may be part of multiple remote sensing devices. In some implementations, each image may be created by a channel. In some implementations, each image created by a channel may be both spatially and spectrally resolved. In some implementations, individual channels may have a similar spatial resolution. In some implementations, different spectral ranges may be resolved in each channel. In some implementations, a stack of images may be based on the one or more channels.

In some implementations, image revisions component 30 may be configured to correct and/or revise systematic and environmental errors common to spectral imaging systems as described, for example in U.S. patent application Ser. No. 14/480,565, filed Sep. 8, 2014, and entitled "SYSTEM AND METHOD FOR CALIBRATING IMAGING MEASUREMENTS TAKEN FROM AERIAL VEHICLES" which is hereby incorporated into this disclosure by reference in its entirety. In some implementations, image revisions component 30 may revise one or more intensity non-uniformities of the one or more images. The one or more intensity non-uniformities may be results from characteristics of one or more collection optics. In some implementations, image revisions component 30 may revise one or more spatial distortions of the one or more images. The one or more spatial distortions may be due to one or more characteristics of the collection optics. In some implementations, image revisions component 30 may revise one or more variations in intensity that result from changes in solar irradiance of the one or more images. For example, image revisions component 30 may utilize one or more of a collocated solar spectrometer, a solar intensity measurement, a reflectance standard, and/or other calibration device or technique to revise the one or more images for variations in solar irradiance.

In some implementations, image revisions component 30 may be configured to register one or more pixels from the one or more channels to a common pixel space. The first channel may correspond to a first spectral range and the second channel may correspond to a second spectral range. For example, one or more pixels of the first channel and the second channel may be registered to a common pixel space such that the corresponding pixels of each channel provide measurements of a common area of the target scene. In some implementations, cross-channel registration may include two-dimensional cross-correlation and/or other techniques to determine the translation, rotation, scaling, and/or warping to be applied to each channel such that one or more pixels from the one or more channels are registered to a common pixel space.

Figure 3:
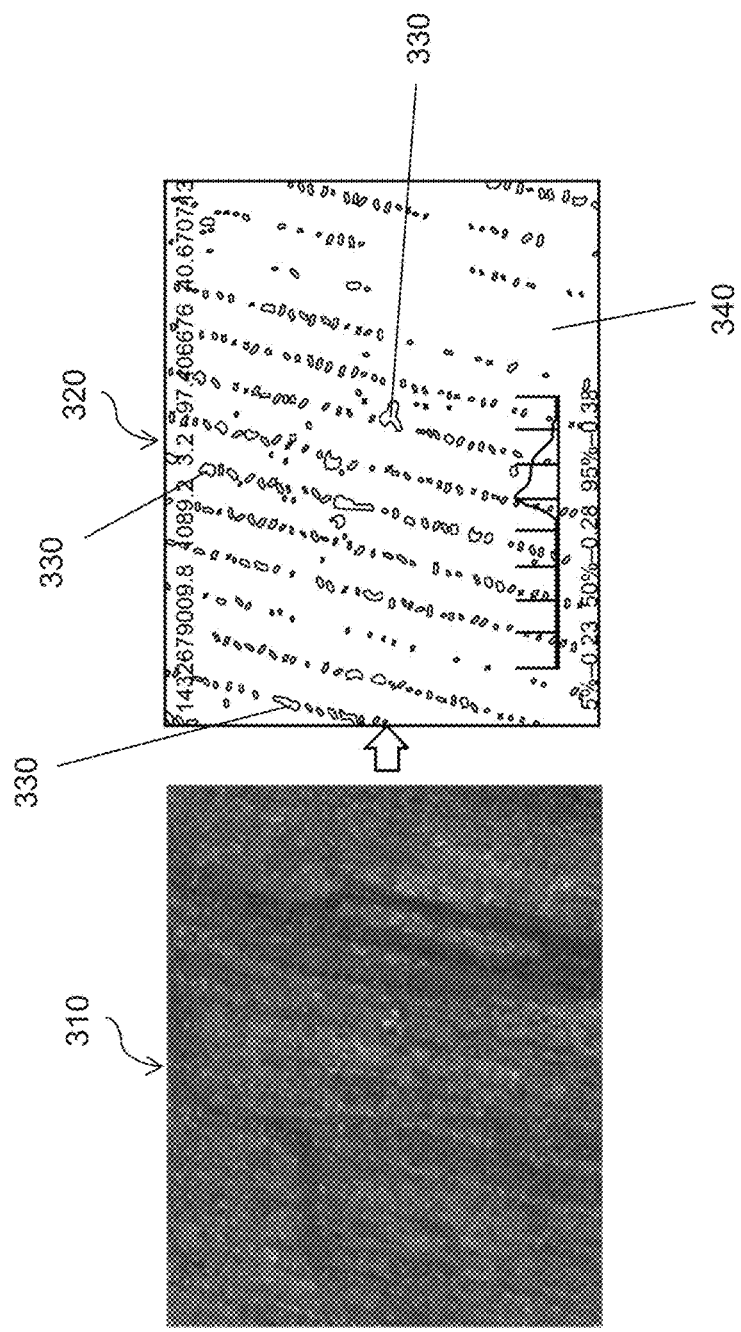
FIG. 3 illustrates segregation of vegetation from background clutter, in accordance with one or more implementations.

In some implementations, contrast adjustment component 32 may be configured to distinguish vegetation from background clutter based on the one or more channels. In some implementations, the vegetation may include one or both of a crop population and a non-crop population. In some implementations, the background clutter may include one or more of soil, standing water, pavement, man-made materials, dead vegetation, other detritus, and/or other background clutter. In some implementations, contrast adjustment component 32 may numerically combine the one or more channels such that a contrast between the vegetation and the background clutter is increased. In some implementations, contrast adjustment component 32 may combine the one or more channels in a ratio or other index such that a contrast between the vegetation and the background clutter is increased. In some implementations, the combination may include a Difference Vegetation Index (Difference VI), a Ratio Vegetation Index (Ratio VI), a Chlorophyll Index, a Normalized Difference Vegetation Index (NDVI), a Photochemical Reflectance Index (PRI), and/or other combinations of channels. In some implementations, contrast adjustment component 32 may amplify the contrast of one or more high spatial frequency components corresponding to the combination. For example, a two-dimensional bandpass filter may be used to suppress signals of spatial frequencies lower than the crop plants or an edge sharpening filter may be used to increase the contrast of plant and non-plant boundaries in the images. By way of a non-limiting example, FIG. 3 illustrates segregation of vegetation from background clutter, in accordance with one or more implementations. In FIG. 3, a false color image 310 may be converted into a high contrast image 320 which segregates growing vegetation 330 from background clutter 340.

Returning to FIG. 1, background clutter segregation component 34 may be configured to segregate image regions corresponding to the vegetation from image regions corresponding to the background clutter. In some implementations, background clutter segregation component 34 may be configured to utilize differing spectral reflectance combinations across multiple wavelength bands to segregate target types. In some implementations, background clutter segregation component 34 may be configured to determine an initial threshold value for the combination. The initial threshold value may be selected to segregate pixels containing vegetation signals from pixels containing background clutter. In some implementations, background clutter segregation component 34 may compare each pixel value in the combination to the threshold value. In some implementations, background clutter segregation component 34 may group adjacent pixels that compare to the threshold value corresponding to the vegetation into "blobs." In some implementations, background clutter segregation component 34 may count a total number of independent blobs with a "blob counting" algorithm and store the count with the value of the threshold.

In some implementations, background clutter segregation component 34 may be configured to adjust the value of the combination threshold to a new value. In some implementations, the combination threshold value adjustment may be repeated for a range of values such that a relationship may be established between the threshold and the number of blobs detected. In some implementations, background clutter segregation component 34 may establish a relationship between the ratio threshold and the number of vegetation "blobs" in the ratio image. In some implementations, background clutter segregation component 34 may be configured to determine a threshold value where detection count plateaus such that the blob count is most stable to changes in threshold. In some implementations, background clutter segregation component 34 may be configured to provide a two-dimensional matrix where each entry is a binary value indicating the presence (or absence) of vegetation within the corresponding pixel.

Figure 4:
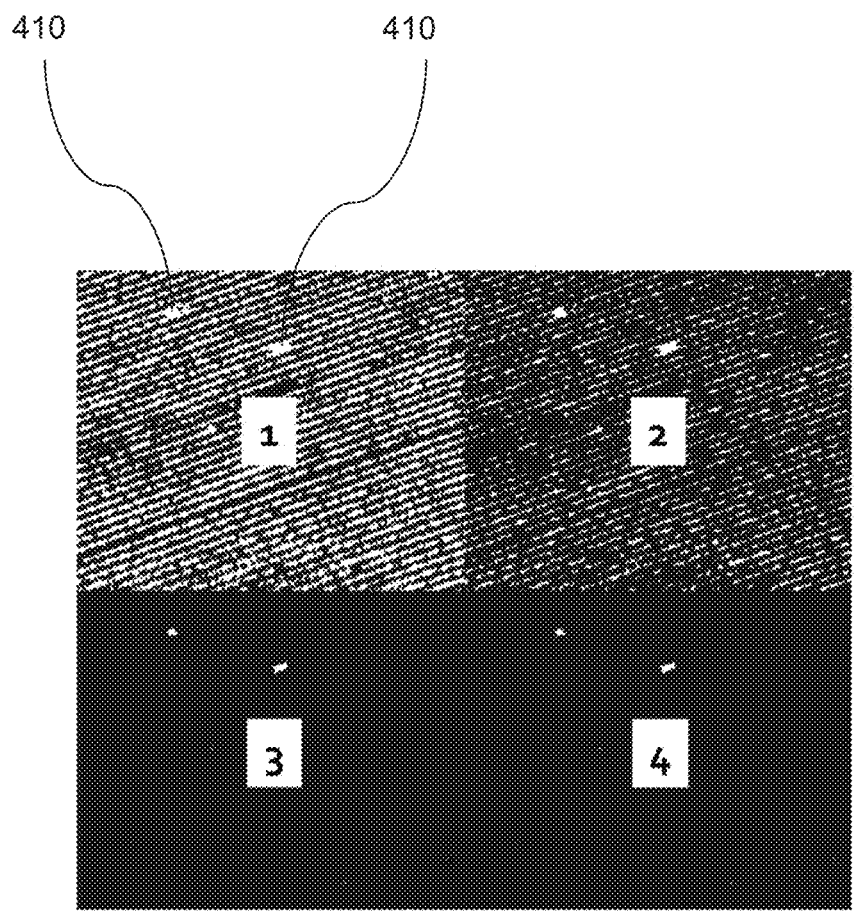
FIG. 4 illustrates segregation of large rafts of non-crop population from the crop population, in accordance with one or more implementations.

In some implementations, crop segregation component 36 may be configured to segregate image regions corresponding to the crop population from image regions corresponding to the non-crop population in the image regions corresponding to the vegetation. In some implementations, crop segregation component 36 may perform an erosion operation on the binary matrix to segregate individual plants which may be grouped together into single blobs. In some implementations, crop segregation component 36 may determine a characteristic size of the crop population based on a statistical distribution of the vegetation size. In some implementations, crop segregation component 36 may segregate one or more contiguous groups of vegetation pixels having a size substantially greater than the characteristic size of the crop population. For example, crop segregation component 36 may be configured to classify and segregate large rafts of weeds from the crop population by identifying blob sizes that are larger and statistically separable from the main population of crop population. In some implementations, crop segregation component 36 may be configured to remove the large rafts of weeds (non-crop population) from the binary matrix of vegetation detections. By way of a non-limiting example, FIG. 4 illustrates segregation of large rafts of non-crop population from the crop population, in accordance with one or more implementations. As depicted in FIG. 4, successive erosion operations 1-4 are performed on the one or more images such that only the large non-crop population areas 410 remain.

Returning to FIG. 1, crop row attributes component 38 may be configured to perform a two-dimensional Fast Fourier Transform (FFT) on the one or more images or on the numerical combination of images from the one or more channels as determined previously to determine the spatial frequencies, orientation, and curvature of peak energy with respect to the one or more images. In some implementations, crop row attributes component 38 may identify two local maxima of peak energy corresponding to crop row spacing (the lowest frequency local maxima) and individual plant spacing along rows (the highest frequency local maxima). An Inverse Fast Fourier Transform (IFFT) of the low frequency local maxima may provide the spatial separation of crop rows and their orientation relative to the one or more images.

Figure 5:
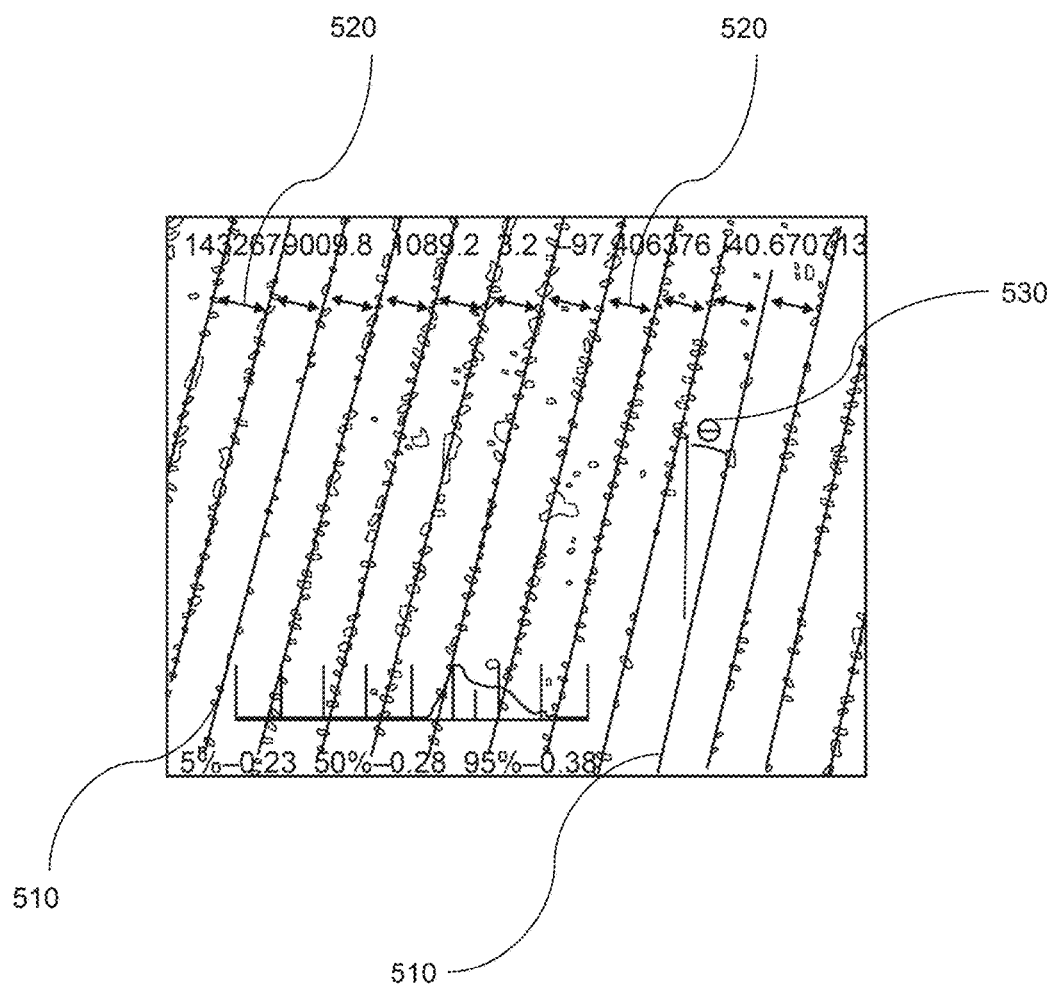
FIG. 5 illustrates detection and characterization of crop rows, in accordance with one or more implementations.

In some implementations, crop row attributes component 38 may perform a Hough transform to provide the location of each row in the one or more images along with individual row orientation, spacing, and curvature. By way of a non-limiting example, FIG. 5 illustrates detection and characterization of crop rows, in accordance with one or more implementations. In FIG. 5, crop rows 510, crop row spacing 520 in pixel coordinates, and crop row orientation 530 relative to the one or more remote sensing devices have been determined. In some implementations, crop row attributes component 38 may determine a spacing of one or more crop rows in pixels. In some implementations, crop row attributes component 38 may determine the pixel's Ground Sample Dimension using externally provided (e.g., by external resources 16) row spacing and the row spacing in pixels.

Returning to FIG. 1, crop row attributes component 38 may be configured to provide a mask to segregate vegetation belonging to the crop population from vegetation belonging to the non-crop population using the previously determined crop row information. In some implementations, crop row attributes component 38 may be configured to characterize a reference spectral signature of vegetation within the one or more crop rows. In some implementations, crop row attributes component 38 may be configured to accept as input a prescribed reference spectral signature from an external resource 16 or may calculate a reference spectral signature by user selection of a region of interest. In some implementations, crop row attributes component 38 may be configured to statistically compare the spectral signature of each pixel to the reference spectral signature. In some implementations, the statistical proximity of each pixel's spectral signature to the reference spectral signature may be used to classify the pixel as belonging to the crop population class or another class. For example, individual plant detections that were classified in the crop class but have statistically different spectral signatures from the reference spectral signature may be reclassified as non-crop plants. Similarly, the reference spectral signature may be used to classify other plant or non-plant pixels.

In some implementations, a user may make a selection of a region of interest in the one or more images. In some implementations, crop row attributes component 38 may determine a spectral signature corresponding to the region of interest. In some implementations, crop row attributes component 38 may determine one or more additional regions and/or pixels in the one or more images having a statistically similar spectral signature. In some implementations, crop row attributes component 38 may classify the one or more additional regions and/or pixels as belonging to the crop population class, the non-crop population class, or another class.

Figure 6:
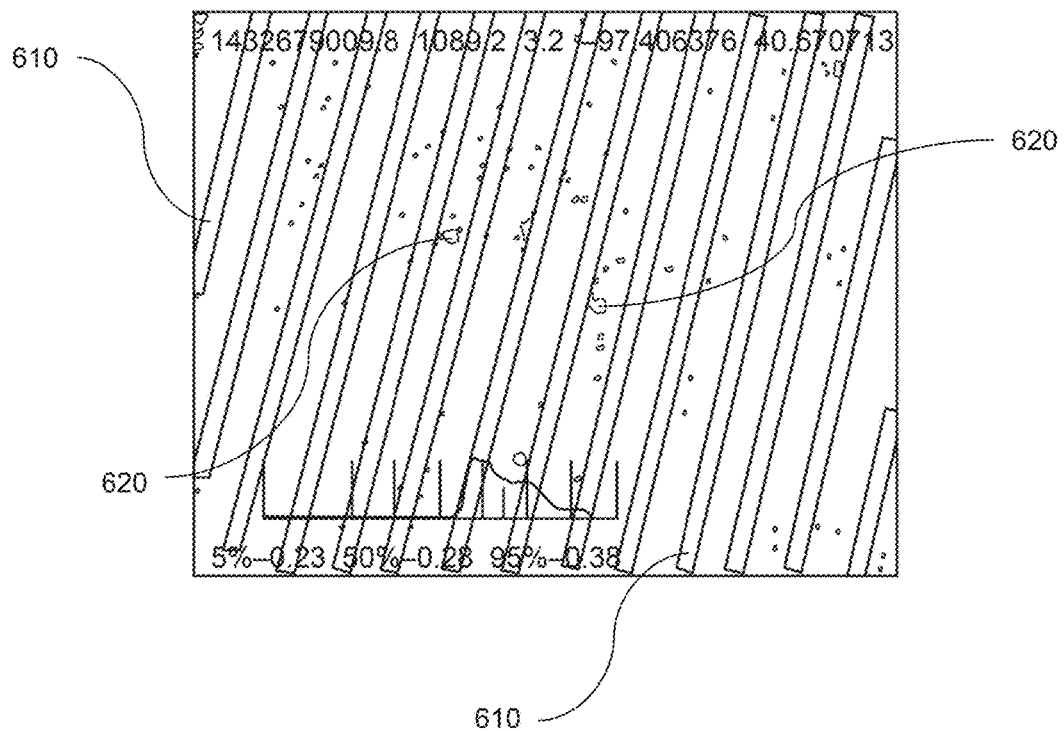
FIG. 6 illustrates segregation of vegetation growing within rows from vegetation growing outside of rows, in accordance with one or more implementations.

By way of a non-limiting example, FIG. 6 illustrates segregation of vegetation growing within rows from vegetation growing outside of rows, in accordance with one or more implementations. As depicted in FIG. 6, a crop row mask 610 is represented as a series of thick lines or curved lines, each fully encompassing one crop row. In FIG. 6, once the location and orientation of the crop rows have been determined, mask 610 is applied to segregate vegetation growing within the rows (e.g., the crop population) from vegetation 620 growing outside of the rows (e.g., non-crop population). In some implementations, the width of the crop row mask 610 may be determined by using a priori information about the crop and/or by dynamically determining the crop width from the image based on the statistical crop size.

In some implementations, crop row attributes component 38 may be configured to classify groups of vegetation pixels as belonging to the crop population if they are positioned statistically within the crop rows. In some implementations, crop row attributes component 38 may be configured to classify groups of vegetation pixels as belonging to the non-crop population if they are positioned statistically outside of the crop rows.

Figure 7:
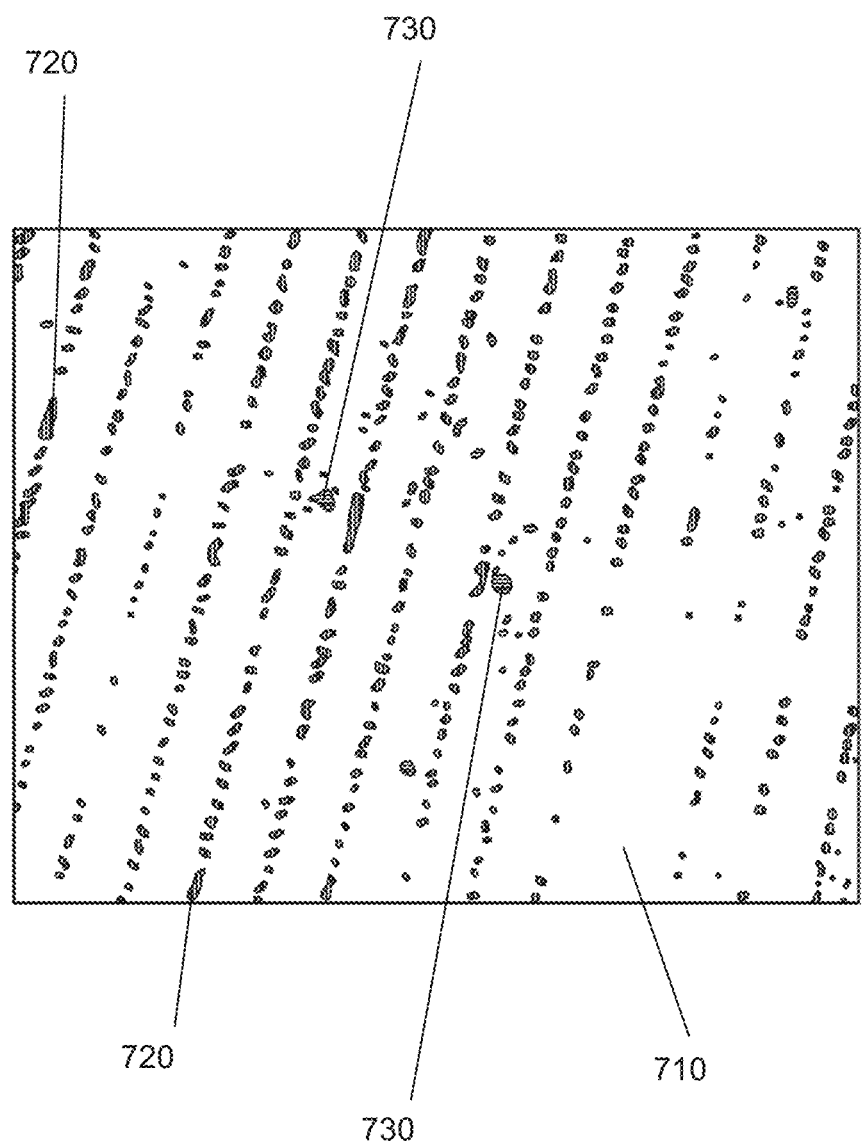
FIG. 7 illustrates complete segregation of crop population from non-crop population and background clutter, in accordance with one or more implementations.

In some implementations, crop row attributes component 38 may be configured to determine a new and dynamic threshold level to improve the segregation of the crop population from the background noise by creating a histogram of pixel values only within the masked crop rows. The histogram may be utilized to determine the correct threshold to separate the plants from the background clutter. In some implementations, background clutter may include one or more of soil, shadows, dead vegetation, weeds, standing water, farming equipment, and/or other background clutter. In some implementations, the newly determined threshold may be applied to the whole image. By way of a non-limiting example, FIG. 7 illustrates complete segregation of crop population 720 from non-crop population 730 and background clutter 710, in accordance with one or more implementations. FIG. 7 depicts the segregation of crop population 720 from non-crop population 730 resulting from the utilization of a histogram and determination of a new threshold value.

Returning to FIG. 1, crop density determination component 40 may determine a crop density corresponding to the crop population and a non-crop density corresponding to the non-crop population. In order to accurately determine vegetation density per unit area, the area over which the vegetation count was conducted may need to be accurately determined. While the optical characteristics (i.e. field of view) of the one or more remote sensing devices may be accurately known, the altitude of the one or more remote sensing devices above the ground level may be more difficult to determine. Accordingly, crop density determination component 40 may convert the determined row spacing from pixels to a linear spatial dimension (e.g., centimeters). In some implementations, crop density determination component 40 may determine an area of land portrayed by the one or more images using the converted row spacing. In some implementations, crop density determination component 40 may determine a first count corresponding to the crop population and a second count corresponding to the non-crop population per unit area for one or more of the images. In some implementations, crop density determination component 40 may determine a crop count and/or non-crop count per unit area for one or more sub-regions of the one or more images. In some implementations, crop density determination component 40 may determine an area of land portrayed by the one or more images using the number of pixels in the image and the pixel's Ground Sample Dimension.

Figure 8:
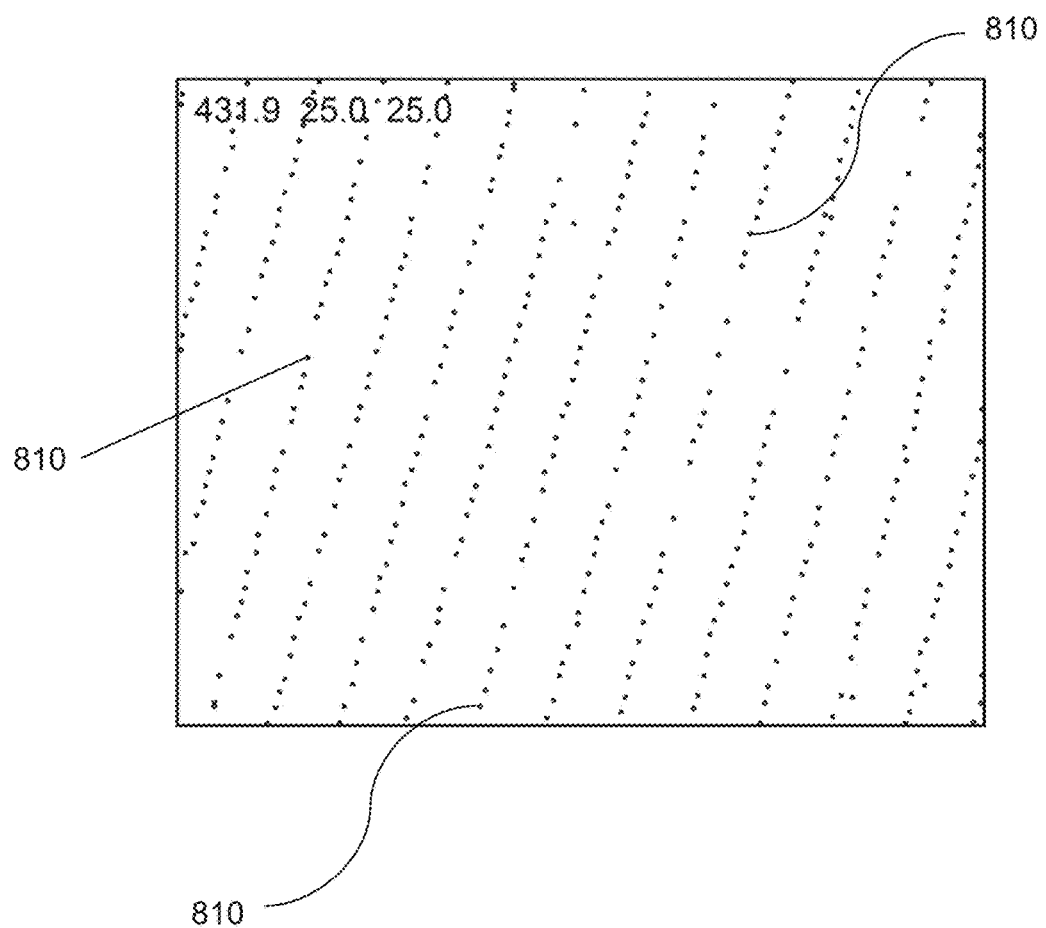
FIG. 8 illustrates a map of plant center positions, in accordance with one or more implementations.

In some implementations, crop density determination component 40 may utilize blob detection techniques and/or other algorithms to identify and count each of the crop plants within the crop row mask. In some implementations, crop density determination component 40 may determine a centroid position of each blob. In some implementations, crop density determination component 40 may provide a list of plant center position coordinates. By way of a non-limiting example, FIG. 8 illustrates a map of plant center positions, in accordance with one or more implementations. FIG. 8 depicts plant centers 810 that are located within each image to determine spacing and count per area.

In some implementations, crop density determination component 40 may determine a pixel distance between each center position using the center position coordinates. In some implementations, crop density determination component 40 may provide a histogram of center to center spacing that may yield a strong peak at the nominal plant spacing. In some implementations, crop density determination component 40 may combine the nominal in-row plant spacing with row-to-row spacing to generate nominal planting density (e.g., plants per acre). In some implementations, crop density determination component 40 may receive user inputs regarding plant spacing and row spacing. In some implementations, crop density determination component 40 may utilize the received user inputs to refine the results of the planting statistics.

In some implementations, crop density determination component 40 may determine a refined plant count through analysis of the length of each blob along the plant row, and/or the spacing between plant centers. In some implementations, crop density determination component 40 may utilize statistics determined through the analysis to account for two plants that have grown together and appear as a single plant or single plants whose leaf structure causes them to appear as two or more plants.

In some implementations, crop density determination component 40 may determine statistics of the crop population including one or more of plant count per unit area, plant size, plant health, and/or other statistics. In some implementations, crop density determination component 40 may determine the crop density by dividing the first count by the determined area of the one or more images. In some implementations, crop density determination component 40 may determine the non-crop density by dividing the second count by the determined area of the one or more images.

In some implementations, crop density determination component 40 may determine plant size statistics by determining a number of contiguous pixels which constitute individual plants. In some implementations, crop density determination component 40 may determine plant health characteristics using one or more of spectral combination methods. For example, combinations of spectral reflectance values may be used to infer conditions of plant health. Such combinations may include Difference Vegetation Index (Difference VI), a Ratio Vegetation Index (Ratio VI), a Chlorophyll Index, a Normalized Difference Vegetation Index (NDVI), a Photochemical Reflectance Index (PRI), and/or other combinations of channels.

In some implementations, operations corresponding to one or more of communications component 28, image revision component 30, contrast adjustment component 32, background clutter segregation component 34, crop segregation component 36, crop row attributes 38, crop density determination component 40, and/or other components may be repeated for multiple overlapping spectral images that cover large farming areas.

In some implementations, presentation component 42 may be configured to effectuate presentation of one or both of a map corresponding to the crop density or a map corresponding to the non-crop density. In some implementations, presentation component 42 may be configured to interpolate and/or resample results for the multiple spectral images onto a common grid spacing for the entire survey area. In some implementations, presentation component 42 may be configured to format the map corresponding to the crop density and/or the map corresponding to the non-crop density into multiple file formats for ease of dissemination, review, and further analysis in other downstream data products.

In some implementations, server(s) 12, client computing platform(s) 18, and/or external resources 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 12, client computing platform(s) 18, and/or external resources 16 may be operatively linked via some other communication media.

A given client computing platform 18 may include one or more processors configured to execute machine-readable instructions. The machine-readable instructions may be configured to automatically, or through an expert or user associated with the given client computing platform 18 to interface with system 10 and/or external resources 16, and/or provide other functionality attributed herein to client computing platform(s) 18. In some implementations, the one or more processors may be configured to execute machine-readable instruction components 28, 30, 32, 34, 36, 38, 40, 42, and/or other machine-readable instruction components. By way of non-limiting example, the given client computing platform 18 may include one or more of a desktop computer, a laptop computer, a handheld computer, a tablet computing platform, a NetBook, a Smartphone, a gaming console, and/or other computing platforms.

In some implementations, the one or more remote sensing devices 24 may include one or more processors configured to execute machine-readable instructions. The machine-readable instructions may be configured to automatically, or through an expert or user associated with the one or more remote sensing devices 24 to interface with system 10 and/or external resources 16, and/or provide other functionality attributed herein to the one or more remote sensing devices 24. In some implementations, the one or more processors may be configured to execute machine-readable instruction components 28, 30, 32, 34, 36, 38, 40, 42, and/or other machine-readable instruction components. In some implementations, the one or more remote sensing devices 24 may include processors 22 and electronic storage 14.

External resources 16 may include sources of information, hosts and/or providers of digital media items outside of system 10, external entities participating with system 10, and/or other resources. In some implementations, some or all of the functionality attributed herein to external resources 16 may be provided by resources included in system 10.

Server(s) 12 may include electronic storage 14, one or more processors 22, and/or other components. Server(s) 12 may include communication lines, or ports to enable the exchange of information with a network and/or other computing platforms. Illustration of server(s) 12 in FIG. 1 is not intended to be limiting. Server(s) 12 may include a plurality of hardware, software, and/or firmware components operating together to provide the functionality attributed herein to server(s) 12. For example, server(s) 12 may be implemented by a cloud of computing platforms operating together as server(s) 12.

Electronic storage 14 may comprise non-transitory storage media that electronically stores information. The electronic storage media of electronic storage 14 may include one or both of system storage that is provided integrally (i.e., substantially non-removable) with server(s) 12 and/or removable storage that is removably connectable to server(s) 12 via, for example, a port (e.g., a USB port, a firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 14 may include one or more virtual storage resources (e.g., cloud storage, a virtual private network, and/or other virtual storage resources). Electronic storage 14 may store software algorithms, information determined by processor(s) 22, information received from server(s) 12, information received from client computing platform(s) 18, and/or other information that enables server(s) 12 to function as described herein.

Processor(s) 22 is configured to provide information processing capabilities in server(s) 12. As such, processor(s) 22 may include one or more of a digital processor, an analog processor, a digital circuit designed to process information, an analog circuit designed to process information, a state machine, and/or other mechanisms for electronically processing information. Although processor(s) 22 is shown in FIG. 1 as a single entity, this is for illustrative purposes only. In some implementations, processor(s) 22 may include a plurality of processing units. These processing units may be physically located within the same device, or processor(s) 22 may represent processing functionality of a plurality of devices operating in coordination. The processor(s) 22 may be configured to execute machine-readable instruction components 28, 30, 32, 34, 36, 38, 40, 42, and/or other machine-readable instruction components. The processor(s) 22 may be configured to execute machine-readable instruction components 28, 30, 32, 34, 36, 38, 40, 42, and/or other machine-readable instruction components by software; hardware; firmware; some combination of software, hardware, and/or firmware; and/or other mechanisms for configuring processing capabilities on processor(s) 22.

It should be appreciated that although machine-readable instruction components 28, 30, 32, 34, 36, 38, 40, and 42 are illustrated in FIG. 1 as being implemented within a single processing unit, in implementations in which processor(s) 22 includes multiple processing units, one or more of machine-readable instruction components 28, 30, 32, 34, 36, 38, 40, and/or 42 may be implemented remotely from the other components and/or subcomponents. The description of the functionality provided by the different machine-readable instruction components 28, 30, 32, 34, 36, 38, 40, and/or 42 described herein is for illustrative purposes, and is not intended to be limiting, as any of machine-readable instruction components 28, 30, 32, 34, 36, 38, 40, and/or 42 may provide more or less functionality than is described. For example, one or more of machine-readable instruction components 28, 30, 32, 34, 36, 38, 40, and/or 42 may be eliminated, and some or all of its functionality may be provided by other ones of machine-readable instruction components 28, 30, 32, 34, 36, 38, 40, and/or 42. As another example, processor(s) 22 may be configured to execute one or more additional machine-readable instruction components that may perform some or all of the functionality attributed below to one of machine-readable instruction components 28, 30, 32, 34, 36, 38, 40, and/or 42.

Figure 9:
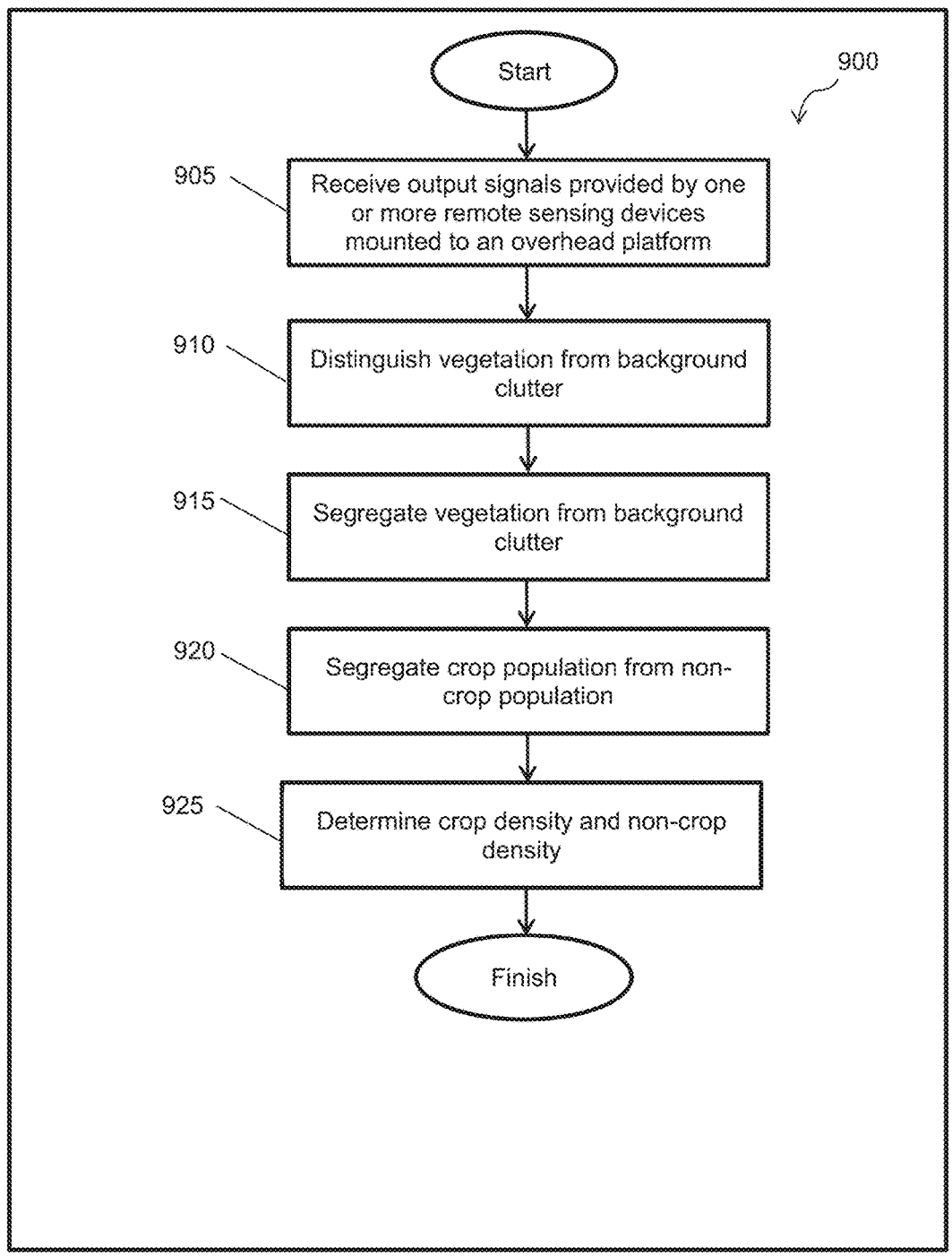
FIG. 9 illustrates a method for determining statistics of plant populations based on overhead optical measurements, in accordance with one or more implementations.

FIG. 9 illustrates a method 900 for determining statistics of plant populations based on overhead optical measurements, in accordance with one or more implementations. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 and described below is not intended to be limiting.

In some implementations, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At an operation 905, output signals provided by one or more remote sensing devices mounted to an overhead platform may be received. In some implementations, the output signals may convey information related to one or more images of a land area where crops are grown. In some implementations, the one or more images may be spatially resolved and spectrally resolved. In some implementations, the output signals may include one or more channels. In some implementations, the first channel may correspond to a first spectral range and the second channel may correspond to a second spectral range. Operation 905 may be performed by one or more hardware processors configured to execute a machine-readable instruction component that is the same as or similar to communications component 28 and image revisions component 30 (as described in connection with FIG. 1), in accordance with one or more implementations.

At an operation 910, vegetation may be distinguished from background clutter based on the one or more channels. In some implementations, the vegetation may include one or both of a crop population and a non-crop population. In some implementations, the background clutter may include one or more of soil, standing water, man-made materials, dead vegetation, and/or other background clutter. Operation 910 may be performed by one or more hardware processors configured to execute a machine-readable instruction component that is the same as or similar to contrast adjustment component 32 (as described in connection with FIG. 1), in accordance with one or more implementations.

At an operation 915, image regions corresponding to the vegetation may be segregated from image regions corresponding to the background clutter. Operation 915 may be performed by one or more hardware processors configured to execute a machine-readable instruction component that is the same as or similar to background clutter segregation component 34 (as described in connection with FIG. 1), in accordance with one or more implementations.

At an operation 920, image regions corresponding to the crop population may be segregated from image regions corresponding to the non-crop population in the image regions corresponding to the vegetation. Operation 920 may be performed by one or more hardware processors configured to execute a machine-readable instruction component that is the same as or similar to crop segregation component 36 (as described in connection with FIG. 1), in accordance with one or more implementations.

At an operation 925, a crop density corresponding to the crop population and a non-crop density corresponding to the non-crop population may be determined. Operation 925 may be performed by one or more hardware processors configured to execute a machine-readable instruction component that is the same as or similar to crop row attributes component 38 and crop density determination component 40 (as described in connection with FIG. 1), in accordance with one or more implementations.

Figure 10:
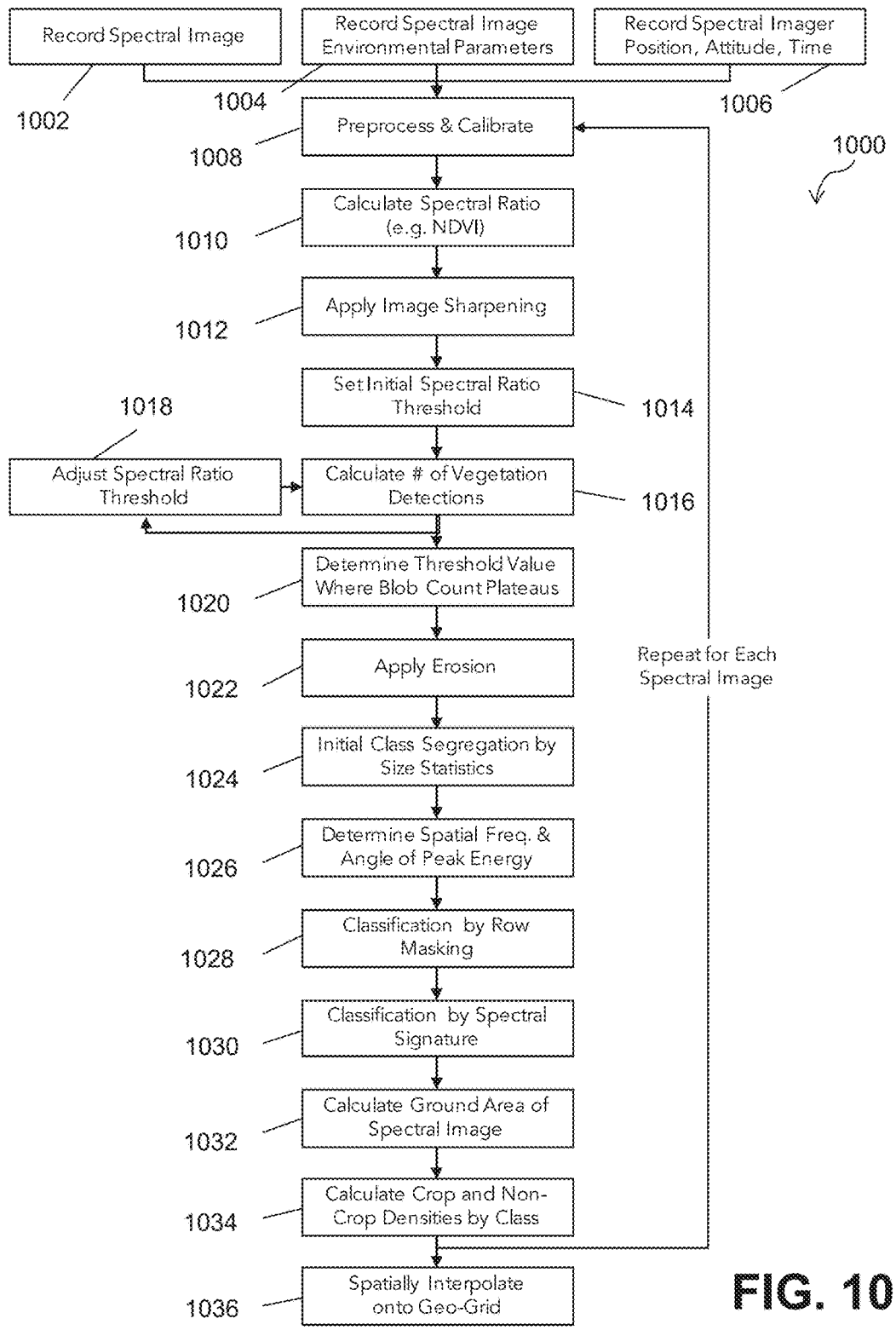
FIG. 10 illustrates process steps performed by the system of FIG. 1, in accordance with one or more implementations.

By way of a non-limiting example, FIG. 10 illustrates process steps 1000 performed by the system of FIG. 1, in accordance with one or more implementations. As depicted in FIG. 10, system 10 may be configured to perform process steps 1002-1006 with the one or more remote sensing devices. For example, the one or more remote sensing devices may record one or more spectral images, record one or more environmental parameters, and record imager position, attitude, and time corresponding to the one or more spectral images.

In some implementations, system 10 may be configured to preprocess and calibrate the one or more spectral images (e.g., process step 1008) by one or more hardware processors configured to execute a machine-readable instruction component that is the same as or similar to image revision component 30.

In some implementations, system 10 may calculate a numerical combination and apply image sharpening (e.g., process steps 1010 and 1012) by one or more hardware processors configured to execute a machine-readable instruction component that is the same as or similar to contrast adjustment component 32.

In some implementations, system 10 may set an initial numerical combination threshold, calculate a number of vegetation detections, adjust the numerical combination threshold, and determine a threshold value where a blob count plateaus (e.g., process steps 1014, 1016, 1018 and 1020) by one or more hardware processors configured to execute a machine-readable instruction component that is the same as or similar to background clutter segregation component 34.

In some implementations, system 10 may apply erosion to the one or more images, segregate crops from non-crops based on size statistics, determine a spatial frequency and an orientation of peak energy (e.g., process steps 1022, 1024, and 1026) by one or more hardware processors configured to execute a machine-readable instruction component that is the same as or similar to crop segregation component 36.

In some implementations, system 10 may classify crops and non-crops by crop row masking, classify crops and non-crops by spectral signature, and calculate a ground area of the one or more spectral images (e.g., process steps 1028, 1030, and 1032) by one or more hardware processors configured to execute a machine-readable instruction component that is the same as or similar to crop row attributes component 38.

In some implementations, system 10 may determine crop and non-crop densities (e.g., process step 1034) by one or more hardware processors configured to execute a machine-readable instruction component that is the same as or similar to crop density determination component 40.

In some implementations, system 10 may spatially interpolate the crop and non-crop densities onto a geo-grid (e.g., process step 1036) by one or more hardware processors configured to execute a machine-readable instruction component that is the same as or similar to presentation component 42.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for determining statistics of plant populations based on overhead optical measurements, the system comprising:
   one or more hardware processors configured by machine-readable instructions to:
   receive output signals provided by one or more remote sensing devices mounted to an overhead platform, the overhead platform comprising an unmanned aerial vehicle, the output signals conveying information related to one or more images of a land area where crops are grown, the one or more images being spatially resolved, the output signals including one or more channels corresponding to one or more spectral ranges;
   numerically combine the output signals such that a contrast between vegetation and background clutter is increased;
   segregate image regions corresponding to the vegetation from image regions corresponding to the background clutter based on the one or more channels, the vegetation including one or both of a crop population and a non-crop population, the background clutter including one or more of soil, rock, standing water, man-made materials, or dead vegetation, wherein segregating image regions comprises:
  classifying groups of pixels as belonging to a vegetation class or the background clutter based on an adjustable threshold of spectral reflectance combinations;
  classifying groups of vegetation pixels as belonging to the crop population if the group of vegetation pixels are positioned statistically within crop rows; and
  classifying groups of vegetation pixels as belonging to the non-crop population if the group of vegetation pixels are positioned statistically outside of the crop rows; and
  determine a plant count per unit area.

2. The system of claim 1, wherein the one or more hardware processors are further configured by machine-readable instructions to:
  revise one or more intensity non-uniformities of the one or more images;
  revise one or more spatial distortions of the one or more images;
  revise one or more intensity values for variations in solar irradiance of the one or more images; or
  register one or more pixels from one or more channels to a common pixel space.

3. The system of claim 1, wherein segregating image regions corresponding to the vegetation from image regions corresponding to the background clutter further comprises:
  utilizing one or more differing spectral reflectance numerical combinations across one or more wavelength bands.

4. The system of claim 3, wherein the one or more hardware processors are further configured by machine-readable instructions to amplify one or more spatial frequency components corresponding to the numerical combination.

5. The system of claim 1, wherein the one or more hardware processors are further configured by machine readable instructions to, in the image regions corresponding to the vegetation, segregate image regions corresponding to the crop population from image regions corresponding to the non-crop population.

6. The system of claim 5, wherein segregating the crop population from the non-crop population further comprises:
  determining a characteristic size of the crop population based on a statistical distribution of the vegetation size; and
  segregating one or more contiguous groups of vegetation pixels having a size substantially greater than the characteristic size of the crop population.

7. The system of claim 5, wherein the one or more hardware processors are further configured by machine-readable instructions to determine one or more of an orientation, a spacing, or a location of one or more crop rows.

8. The system of claim 7, wherein the one or more hardware processors are further configured by machine-readable instructions to:
  characterize a reference spectral signature of vegetation within the one or more crop rows; and/or determine a reference spectral signature from an external resource; and/or determine a reference spectral signature corresponding to a user selection of a region of interest; and
  statistically compare a spectral signature of each pixel to the reference spectral signature; and
  assign each pixel as belonging to same class or another class as the reference spectral signature.

9. The system of claim 7, wherein the one or more hardware processors are further configured to:
  determine a spacing of one or more crop rows in pixels;
  determine the pixel's Ground Sample Dimension using externally provided row spacing and the row spacing in pixels; and
  determine an area of land portrayed by the one or more images using the number of pixels in the image and the pixel's Ground Sample Dimension.

10. The system of claim 9, further comprising determining the crop density and the non-crop density by determining a first count corresponding to the crop population and a second count corresponding to the non-crop population, wherein the crop density is determined by dividing the first count by the determined area of the land and wherein the non-crop density is determined by dividing the second count by the determined area of the land.

11. A method for determining statistics of plant populations based on overhead optical measurements, the method comprising:
  receiving output signals provided by one or more remote sensing devices mounted to an overhead platform, the overhead platform comprising an unmanned aerial vehicle, the output signals conveying information related to one or more images of a land area where crops are grown, the one or more images being spatially resolved, the output signals including one or more channels corresponding to one or more spectral ranges;
  numerically combine the output signals such that a contrast between the vegetation and the background clutter is increased;
  segregating image regions corresponding to the vegetation from image regions corresponding to the background clutter based on the one or more channels, the vegetation including one or both of a crop population and a non-crop population, the background clutter including one or more of soil, rock, standing water, man-made materials, or dead vegetation, wherein segregating image regions comprises:
    classifying groups of pixels as belonging to a vegetation class or the background clutter based on an adjustable threshold of spectral reflectance combinations;
    classifying groups of vegetation pixels as belonging to the crop population if the group of vegetation pixels are positioned statistically within crop rows; and
    classifying groups of vegetation pixels as belonging to the non-crop population if the group of vegetation pixels are positioned statistically outside of the crop rows; and
  determining a plant count per unit area.

12. The method of claim 11, further comprising:
  revising one or more intensity non-uniformities of the one or more images;
  revising one or more spatial distortions of the one or more images;
  revising one or more intensity values for variations in solar irradiance of the one or more images; or
  registering one or more pixels from one or more channels to a common pixel space.

13. The method of claim 11, wherein segregating image regions corresponding to the vegetation from image regions corresponding to the background clutter further comprises:

utilizing one or more differing spectral reflectance numerical combinations across one or more wavelength bands.

14. The method of claim 13, further comprising amplifying one or more spatial frequency components corresponding to the numerical combination.

15. The method of claim 11, further comprising segregating image regions corresponding to the crop population from image regions corresponding to the non-crop population in the image regions corresponding to the vegetation.

16. The method of claim 15, wherein segregating the crop population from the non-crop population further comprises:
determining a characteristic size of the crop population based on a statistical distribution of the vegetation size; and
segregating one or more contiguous groups of vegetation pixels having a size substantially greater than the characteristic size of the crop population.

17. The method of claim 15, further comprising determining one or more of an orientation, a spacing, curvature, or a location of one or more crop rows.

18. The method of claim 17, further comprising:
characterizing a reference spectral signature of vegetation within the one or more crop rows; and/or determining a reference spectral signature from an external resource; and/or determining a reference spectral signature corresponding to a user selection of a region of interest; and
statistically comparing a spectral signature of each pixel to the reference spectral signature; and
assigning each pixel as belonging to same class or another class as the reference spectral signature.

19. The method of claim 17, further comprising:
determining a spacing of one or more crop rows in pixels;
determining the pixel's Ground Sample Dimension using externally provided row spacing and the row spacing in pixels; and
determining an area of land portrayed by the one or more images using the number of pixels in the image and the pixel's Ground Sample Dimension.

20. The method of claim 19, further comprising determining the crop density and the non-crop density by determining a first count corresponding to the crop population and a second count corresponding to the non-crop population, wherein the crop density is determined by dividing the first count by the determined area of the land and wherein the non-crop density is determined by dividing the second count by the determined area of the land.

21. A system configured for determining statistics of plant populations based on overhead optical measurements, the system comprising:
one or more hardware processors configured by machine-readable instructions to:
receive output signals provided by one or more remote sensing devices mounted to an overhead platform, the overhead platform comprising an unmanned aerial vehicle, the output signals conveying information related to one or more images of a land area where crops are grown, the one or more images being spatially resolved at a spatial frequency and that are resolved spectrally;
segregate image regions corresponding to the vegetation from image regions corresponding to the background clutter based on image data, the vegetation including one or both of a crop population and a non-crop population, the background clutter including one or more of soil, rock, standing water, man-made materials, or dead vegetation, wherein segregating image regions comprises:
classifying groups of pixels as belonging to a vegetation class or the background clutter based on an adjustable threshold of spectral reflectance combinations;
classifying groups of contiguous vegetation pixels as belonging to a first vegetation class if spatial and spectral characteristics of a given group are proximate to a statistical description of the first vegetation class; and
classifying the groups of contiguous vegetation pixels as belonging to another vegetation class if the spatial and spectral characteristics of a given group are not proximate to a statistical description of the first vegetation class; and
determine a number of groups of contiguous vegetation pixels belonging to the first vegetation class in the one or more images of the land area.

* * * * *

UNITED STATES PATENT AND TRADEMARK OFFICE
CERTIFICATE OF CORRECTION

| | | |
|---|---|---|
| PATENT NO. | : 10,318,810 B2 | Page 1 of 1 |
| APPLICATION NO. | : 15/268370 | |
| DATED | : June 11, 2019 | |
| INVENTOR(S) | : Michael Ritter, Michael Milton and Peter Matusov | |

It is certified that error appears in the above-identified patent and that said Letters Patent is hereby corrected as shown below:

On the Title Page

Item (54) and in the Specification, Column 1, Lines 1-4, Title of Application, replace:
"SYSTEMS AND METHODS FOR DETERMINING STATISTICS PLANT POPULATIONS BASED ON OVERHEAD OPTICAL MEASUREMENTS"
With:
-- SYSTEMS AND METHODS FOR DETERMINING STATISTICS OF PLANT POPULATIONS BASED ON OVERHEAD OPTICAL MEASUREMENTS --

Signed and Sealed this
Seventeenth Day of November, 2020

Andrei Iancu
*Director of the United States Patent and Trademark Office*